T. J. McMEEKIN.

CURTAIN FASTENER.

APPLICATION FILED OCT. 3, 1918.

Reissued Dec. 31, 1918. 14,581.

*Inventor:*
*T. J. McMeekin.*
by Emery, Booth, Janney & Varney
*Att'ys.*

UNITED STATES PATENT OFFICE.

THOMAS J. McMEEKIN, OF JACKSONVILLE, FLORIDA, ASSIGNOR TO CARR FASTENER COMPANY, OF CAMBRIDGE, MASSACHUSETTS, A CORPORATION OF MAINE.

CURTAIN-FASTENER.

14,581. Specification of Reissued Letters Patent. Reissued Dec. 31, 1918.

Original No. 1,204,173, dated November 7, 1916, Serial No. 79,154, filed February 18, 1916. Application for reissue filed October 3, 1918. Serial No. 256,752.

*To all whom it may concern:*

Be it known that I, THOMAS J. McMEEKIN, a citizen of the United States, residing at Jacksonville, in the county of Duval and State of Florida, have invented a new and useful Curtain-Fastener, of which the following is a specification.

This invention relates to a fastener especially designed for use in connection with the curtains of automobiles, motor boats, street cars and the like, one of the objects of the invention being to provide a fastener the parts of which can be easily assembled and, when so assembled will hold a curtain in closed position without danger of becoming accidentally detached, the fastening members being so shaped that when one of them is shifted to a predetermined position relative to the other, it can be easily removed therefrom.

A further object is to provide a fastener of this type which does not require the use of springs, which is formed of but few parts and will not easily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Referring to the figures by characters of reference 1 designates a stud having a plurality of annular grooves 2. This stud may, if desired, be in the form of a screw adapted to be driven into a wooden support, although it is to be understood that the said stud can be in bolt form or of any other desired form. This stud may have a kerf 3 in its outer end whereby it can be easily screwed into position.

Figure 1:
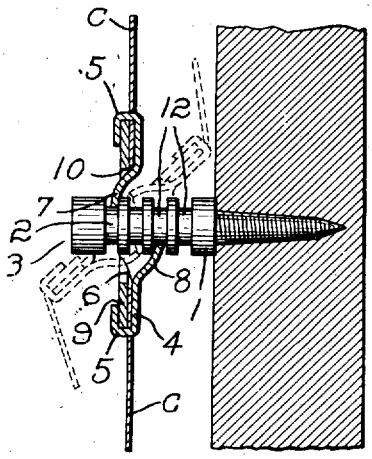
Figure 1 is a view partly in section and partly in elevation of a fastener such as constitutes the present invention.
Figure 2:
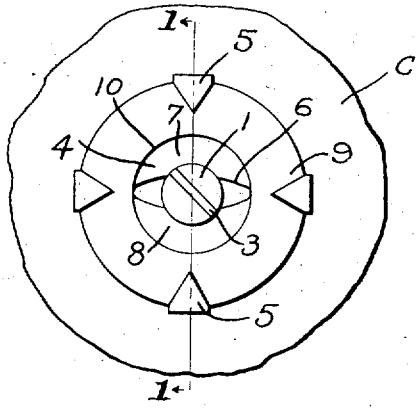
Fig. 2 is a front elevation thereof.

The member which coöperates with the stud 1 is in the form of an eye which is of novel construction. This eye includes a sheet metal disk 4 having prongs 5 at the periphery thereof. An opening 6 is formed in the center portion of this disk and the upper portion of the wall of the opening is pressed outwardly so as to form an outwardly and downwardly inclined lip, while the lower portion of the wall of the opening is pressed inwardly so as to form an inwardly and upwardly inclined lip, the two lips being indicated at 7 and 8 respectively. The horizontal diameter of the opening is greater than the greatest diameter of the stud 1 and the distance between the middle portions of the edges of the lips 7 and 8 is also greater than the greatest diameter of the stud 1. The vertical distance between the horizontal planes occupied by the middle portions of the edges of the lips 7 and 8, however, is substantially equal to the smallest diameter of the stud 1. Furthermore the distance between the vertical planes occupied by the edges of the lips 7 and 8 is approximately equal to the distance between alternate grooves 2 in the stud, and as shown particularly in Fig. 1. In addition to the disk 4, another disk 9 is employed, this disk being provided with a central opening 10 the diameter of which is approximately equal to the greatest diameter of the opening 6.

In applying the eye member of the fastener to a curtain C, an opening is first formed in the curtain after which the disk 4 is placed back of the curtain and the prongs 5 forced therethrough. The disk 9 is then placed on the outer face of the curtain so as to surround the opening and the prongs 5 are bent over the disk thereby to hold the two disks assembled and clamped against opposed faces of the curtain. The stud 1 is then secured at the desired point whereupon the device is ready for use. In fastening the curtain the lower portion of the button is swung forwardly while the upper portion of the button is pressed rearwardly, as shown by dotted lines in Fig. 1. Thus the free edges of the lips 7 and 8 will be brought into a substantially vertical plane and can slip freely along the stud. The curtain is then released whereupon the button will assume a substantially vertical position, the upper lip 7 entering one of the grooves 2, while the lower lip 8 moved upwardly into another groove 2. Any tendency of the curtain C to press outwardly will be resisted by the lip 7 pushing against the wall of the groove in which it is seated. When it is desired to remove the curtain, it is merely necessary to tilt the eye as hereinbefore pointed out, thus to remove the lips 7 and 8 from the grooves 2 whereupon the eye can be slipped forwardly off of the stud. It is to be understood that the openings in the disks can be angular if desired and the same is likewise true of the studs 1.

What is claimed is:—

1. A fastener including a stud, an eye having a stud receiving opening, the opposed upper and lower portions of the wall of said opening being pressed in opposite directions to form oppositely inclined lips, the distance on a straight line between the edges of the lips being greater than the greatest diameter of the stud but the vertical distance between the planes occupied by the middle portions of the edges of the lips being less than the greatest diameter of the stud.

2. A fastener of the character described including a stud having annular grooves, a curtain engaging eye having a stud receiving opening, the horizontal diameter of the opening being greater than the greatest diameter of the stud, the upper portion of the wall of the opening being pressed outwardly to form a downwardly and outwardly inclined lip, the lower portion of the wall of the opening being pressed inwardly to form an upwardly and inwardly inclined lip, the straight line distance between the middle portions of the lips being greater than the greatest diameter of the stud but the vertical distance between the horizontal planes occupied by the middle portions of the lips being less than the greatest diameter of the stud.

3. A fastener of the character described including a stud having portions of different diameters, and an eye having a stud receiving opening, the horizontal diameter of the opening being greater than the greatest diameter of the stud, the upper portion of the wall of the opening being pressed outwardly to form a downwardly and outwardly inclined lip, the lower portion of the wall of the opening being pressed inwardly to form an upwardly and inwardly inclined lip, the straight line distance between the middle portions of the lips being greater than the greatest diameter of the stud but the vertical distance between the horizontal planes occupied by the middle portions of the lips being less than the greatest diameter of the stud.

4. A fastener of the character described including a stud having annular grooves, and a curtain engaging eye including a disk having a stud receiving opening the horizontal diameter of which is greater than the greatest diameter of the stud, the upper portion of the wall of the opening being pressed outwardly to form a downwardly and outwardly inclined lip and the lower portion of the wall of the opening being pressed inwardly to form an inwardly and upwardly inclined lip, the straight line distance between the middle portions of the lips being greater than the greatest diameter of the stud but the vertical distance between the horizontal planes occupied by the middle portions of the edges of the lips being less than the greatest diameter of the stud, a second disk having an opening surrounding the opening in the first mentioned disk, and means carried by one of the disks for holding the two disks together, said disks constituting curtain clamping means.

5. A fastener comprising, in combination, a stud having a head providing a shoulder, a socket providing a jaw for engagement behind said shoulder and a stud engaging portion contacting with the shank of the stud at a point rearwardly of said shoulder and on the opposite side of the stud from said jaw.

6. A fastener comprising, in combination, a stud having a head providing a shoulder, a socket providing a jaw for engagement behind said shoulder and a stud engaging portion contacting with the shank of the stud at a point rearwardly of said shoulder and on the opposite side of the stud from said jaw, said stud and socket being separable by relative tipping movement in one directon only.

7. A fastener comprising, in combination, a stud having a head providing a shoulder, a socket providing a rigid jaw for engagement behind said shoulder and a stud engaging portion contacting with the shank of the stud at a point rearwardly of said shoulder and on the opposite side of the stud from said jaw.

8. A fastener comprising, in combination, a stud having a head providing an abrupt shoulder, a socket providing a jaw for engagement behind said shoulder and a stud engaging portion contacting with the shank of the stud at a point rearwardly of said shoulder and on the opposite side of the stud from said jaw.

9. A fastener comprising, in combination, a stud having a head providing a shoulder, a socket providing a jaw for engagement behind said shoulder and above said stud and a stud engaging portion contacting with the shank of the stud at a point rearwardly of said shoulder and on the opposite side of the stud from said jaw, said stud and socket being separable by outward movement of the side of said socket opposite said jaw.

10. A separable fastener comprising, in combination, a stud having a head and a shank portion, the rear of said head providing a shoulder, a socket providing an unyielding portion for engagement with said shoulder, said stud and socket being separable by relative tipping movement in one direction only.

11. A separable fastener comprising, in combination, a stud having a head and a shank portion, the rear of said head providing a shoulder, a socket providing an unyielding portion for engagement with said shoulder, and a shank engaging portion rearwardly of and opposite said unyielding portion, said stud and socket being separable by relative tipping movement in one direction only.

12. A separable fastener comprising, in combination, a stud having a head and a shank portion, the rear of said head providing a shoulder, a socket providing an unyielding portion for engagement with said shoulder, said stud and socket being separable by relative tipping movement in one direction only by relative outward movement on the stud of that portion of the socket opposite said shoulder.

In testimony that I claim the foregoing as my own, I have hereto affixed my signature.

THOS. J. McMEEKIN.